United States Patent [19]

Worden et al.

[11] 4,044,580

[45] Aug. 30, 1977

[54] ROLLING MILL GAP SENSOR

[75] Inventors: Donald A. Worden, Pompton Plains; William I. de Versterre, Warren; Henry Alfred Petry, Sparta, all of N.J.

[73] Assignee: Marotta Scientific Controls, Inc., Boonton, N.J.

[21] Appl. No.: 749,696

[22] Filed: Dec. 13, 1976

Related U.S. Application Data

[63] Continuation of Ser. No. 592,540, July 2, 1975, abandoned.

[51] Int. Cl.² .................................................. B21B 37/08
[52] U.S. Cl. ............................................. 72/21; 33/182
[58] Field of Search ................. 72/21, 35, 31; 33/182; 324/34 TK

[56] References Cited

U.S. PATENT DOCUMENTS

| 3,353,385 | 11/1967 | Neumann et al. | 72/21 |
| 3,394,575 | 7/1968 | Stone | 72/221 |
| 3,516,273 | 6/1970 | Stone | 72/21 |
| 3,646,686 | 3/1972 | Kreishorte | 33/182 |
| 3,777,526 | 12/1973 | Fink et al. | 72/35 |
| 3,850,015 | 11/1974 | Andresen | 72/31 |
| 3,902,114 | 8/1975 | Alich | 72/21 X |

FOREIGN PATENT DOCUMENTS

| 1,102,947 | 5/1955 | France | 33/182 |
| 827,167 | 2/1960 | United Kingdom | 33/182 |

Primary Examiner—Milton S. Mehr
Attorney, Agent, or Firm—Roy C. Hopgood; John M. Calimafde; Charles W. Neill

[57] ABSTRACT

Rolling mills, especially for sheet metal, and also paper, rubber and similar rolling mills, require accurate control of the gap between the rolls since this determines the uniformity of the gauge of the material rolled by the mill. This invention provides a rolling mill with sensors that cooperate with the circumferential surfaces of the rolls, or rigid parts thereof, to detect relative movement of the rolls in directions that affect the roll gap and the gauge of the material being rolled. Response of the sensors operates a transducer to affect automatic correction of changes in the spacing of the rolls from one another.

14 Claims, 5 Drawing Figures

ROLLING MILL GAP SENSOR

This application is a continuation of application Ser. No. 592,540, filed July 2, 1975, now abandoned.

BACKGROUND AND SUMMARY OF THE INVENTION

Various controls for rolling mill roll gaps are known and the problem presented has been that that means for detecting changes in the roll gap have been indirect; that is, they have measured relative movement of parts of the mill or the rolls other than the actual surfaces of the rolls on a center line extending between the axes of rotation of the rolls themselves. Another difficulty has been that the signal for the control equipment was initiated at a location remote from the actual roll pass and there was lost motion and/or change in the amount of displacement at the signal detection location as compared with the roll gap.

While it is not possible to monitor a roll gap while material is actually passing through the gap; this invention obtains the same effect by means of sensors, such as contacts which touch the rolls, just to one side of the material which is being rolled. The preferred embodiment uses contacts, but proximity sensors or other types can be used, if desired.

This invention provides several ways which overcome the problem that the roll gap is so small that it does not provide clearance for stiff contacts to extend between the rolls. Unless the contacts and their connectors are rigid, accurate signal response to roll gap changes cannot be obtained.

This invention provides such clearance by offsetting axially the contacts, or other sensors, that detect change in roll spacing, and by providing grooves in a confronting face of one roll to obtain the necessary clearance from the circumference of the other roll for receiving a rigid detection device.

In a modified construction of the invention, collars at the ends of the rolls, near the roll necks, are provided and made integral with the roll structure so as to provide, in effect, extensions of the circumferential surfaces of the rolls themselves.

The contacts that bear against the roll surfaces are connected to rigid arms that operate a transducer located close to the rolls themselves. This avoids lost motion in the motion-transmitting parts between the contacts and the transducer; and also makes the apparatus compact and inexpensive.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
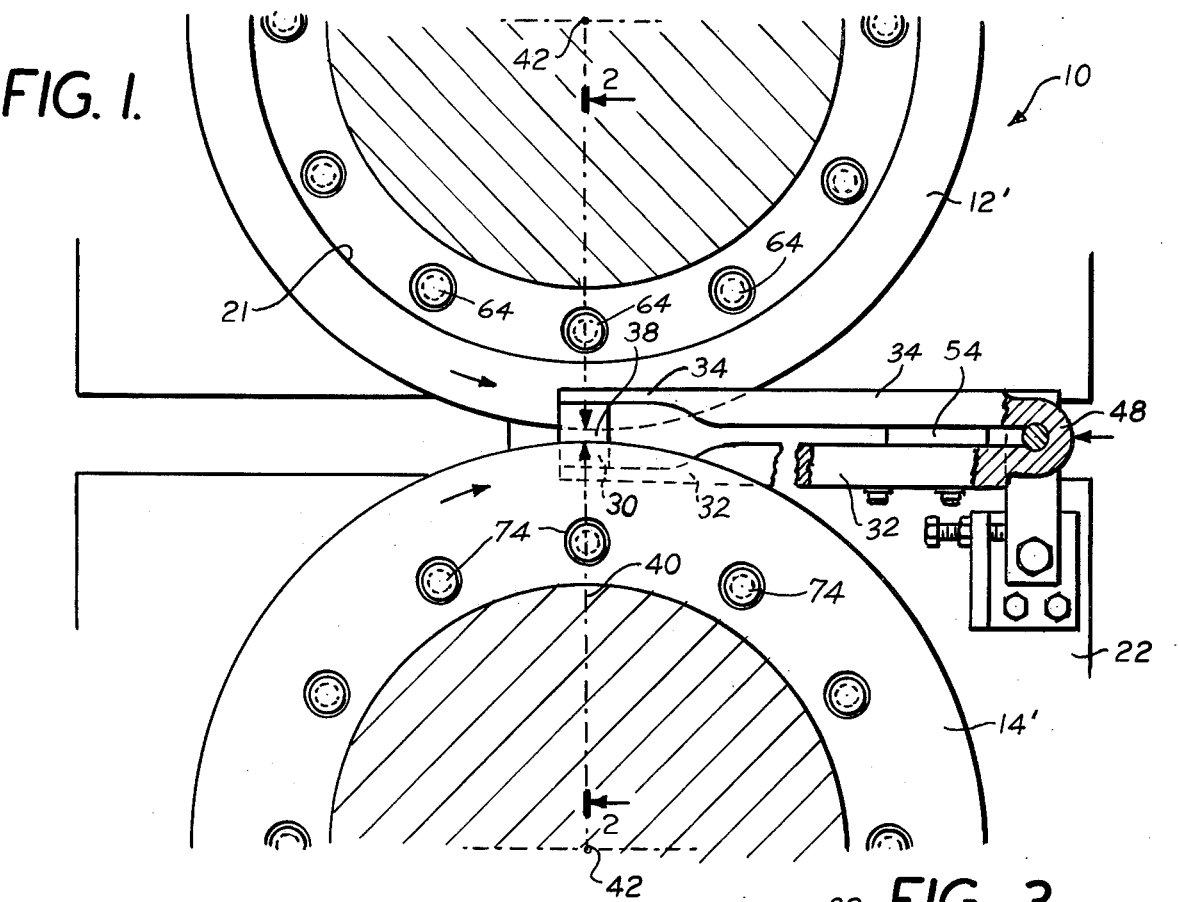
FIG. 1 is a diagrammatic view showing the portions of two rolls and sensing equipment for determining changes in the gap in accordance with this invention.

FIG. 1 shows a rolling mill 10 having an upper roll 12 and a lower roll 14. Each of these rolls has a neck 16 which extends into a bearing chock 18. These chocks are movable toward and from one another and are held in a frame of the machine in accordance with conventional construction.

Figure 2:
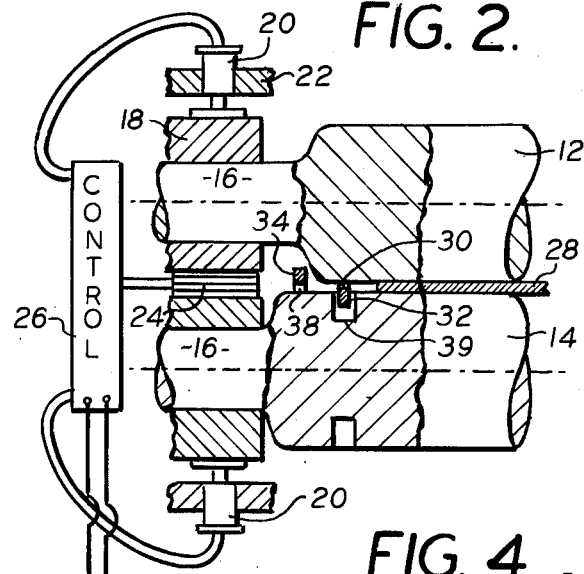
FIG. 2 is a diagrammatic view, on a reduced scale and mostly in section along the line 2—2 of FIG. 1.

FIG. 2 shows means for urging the chocks 18 toward one another, these means being illustrated diagrammatically as screws 20 threading through portions of a frame 22 of the rolling mill.

There is a block 24 located between the upper and lower bearing chocks 18; and the thickness of this block 24 is changed by adding shims or by hydraulic means to change the roll gap between the rolls 12 and 14. The loading screws 20 hold the chocks 18 in firm contact with the block 24. Where hydraulic means are used to change the thickness of the block 24 a control 26 supplies and withdraws hydraulic fluid to control the thickness of the block 24 and to increase or reduce the roll gap with appropriate adjustment of the loading screws 20.

FIG. 2 shows a sectional view of a strip of sheet metal 28 passing through the gap between the rolls 12 and 14.

A contact 38 bears against the circumference of the roll 14 and this contact 38 is carried on an arm 34, the construction of which will be described more clearly in connection with other figures of the drawing. This contact 38 bears against the actual circumference of the roll 14 but at a location spaced from the strip 28 in a direction of the axis of the roll 14.

Another contact 30 bears against the circumferential face and the upper roll 12; and this contact 34 is carried by a rigid arm 32 which extends into a groove 39 in the circumference of the lower roll 14. The purpose of the groove 39 is to provide clearance between the circumference of the rolls 12 and 14 for the contact 30 and arm 32 to extend into a position located along a line 40 (FIG. 1) which extends through the axes of rotation 42 of the rolls 12 and 14.

The contacts 30 and 38 are located on, or immediately adjacent to, this line 40 so that they are at the same phase angle of the rolls that has actual contact with the strip being rolled by the mill. This location of the contacts 30 and 38 has the advantage that in the event of an eccentricity of either or both of the rolls, the contacts indicate this defect at the time when it is effecting the strip; whereas locations of the contacts 30 and 38 at some other part of the circumference of the rolls would indicate the eccentricity at a time when it was not really affecting the roll gap.

Figure 4:
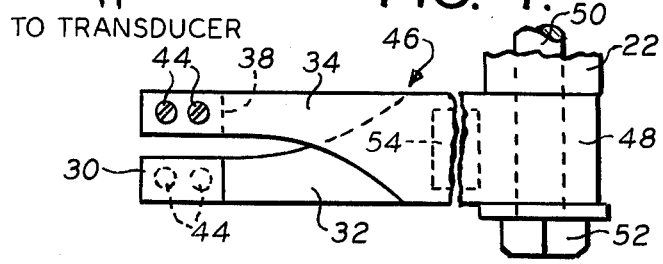
FIG. 4 is a top plan view of the contacts and contact supporting arms as shown in FIG. 1.

FIG. 4 shows the preferred construction of the arms 32 and 34. The ends of these arms that carry the contact blocks 30 and 38 are offset from one another in a direction parallel to the axes of rotation of the rolls. Each of the contacts 30 and 38 is preferably secured to the arms 32 and 34, respectively, by fastening means such as screws 44 which extend through the arms and which thread into the contacts 30 and 38.

A short distance beyond the contacts 30 and 38, the arms 32 and 34 become wider, as shown in FIG. 4, and thicker as shown in FIG. 1. This increases the cross section and the rigidity of the arms 32 and 34.

In the illustrated construction, the arms 32 and 34 are parts of a one-piece frame 46 which has a spring element 48 which extends around and supports the frame from a stud 50 that extends from a rigid part of the frame 22 of the rolling mill. FIG. 4 shows the frame 46 held on a portion of the frame 22 by a nut 52.

A transducer 54 (FIG. 1) is located between the arms 32 and 34 ahead of the supporting stud 50.

Any change in the gap between the rolls 12 and 14 causes the contacts 30 and 38 to move toward or from one another and this relative movement of the contacts changes the pressure of the arms 32 and 34 on the transducer 54 and thus gives a signal of the roll gap change. This gives an instantaneous signal to the control 26 which effects an operation of the hydraulic control of the block 26 and the hydraulic loading devices 20 to restore the roll gap to its intended dimension. The construction of the control 26 and the circuitry of the transducer 54 are not illustrated since such structure is well understood in the art and no description of it is necessary for a full understanding of this invention.

This invention is particularly useful with 4-high rolling mills where the rolls 12 and 14 have necks 16 which turn in chocks 18 but where the chocks slide up and down freely in the guides of the rolling mill frame. The rolls 12 and 14 are loaded by the back-up rolls and the roll gap is controlled by blocks 24 located between chocks of the back-up rolls, and the pressure urging the back-up rolls against the working rolls 12 and 14 is obtained by hydraulic loading or prestressing of the mill by hydraulic means that urge the back-up rolls more firmly into contact with the working rolls 12 and 14. Such rolling mills are well understood in the art and, as far as this invention is concerned, are merely an alternate way of loading the rolls 12 and 14.

Figure 3:
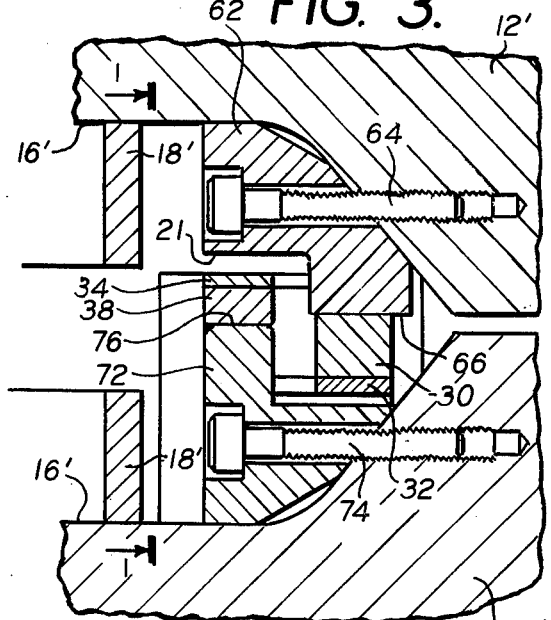
FIG. 3 is a sectional view, on a larger scale, similar to part of FIG. 2 but showing a modified construction in which the circumferential surfaces that the contacts bear against are collars rigid with the respective rolls of the mill.

FIG. 3 shows an alternative construction where collars on the rolls provide, in effect, extensions of the circumferences of the rolls for use with the contacts of this invention. In FIG. 3 there is an upper roll 12' and a lower roll 14'. These rolls have necks 16' which turn in bearing chocks 18'.

There is a collar 62 secured to the roll 12' between the bearing block or chock 18' and the full diameter portion of the roll 12'. This collar 62 is rigidly secured to the roll 12' at a location axially spaced from the full diameter portion of the roll 12'. In the construction shown there is a screw 64 securing the collar 62 rigidly in place on the roll 12'. It will be understood that the collar 62 is annular and that there are a circle of screws 64 at angularly spaced locations around the end face of the collar 62.

The collar 62 has a circumferential face 66 which corresponds in diameter with the circumference of the full diameter portion of the roll 12'. In order to obtain accurate results, the circumferential surface 66 is preferably ground at the same time that the circumferential face of the full diameter portion of the roll 12' is ground. Thus the contact 30 on the arm 32 contacts with the circumferential face 66 in the same way that it contacted with the face of the roll 12 in FIG. 2.

Another collar 72 is secured to the roll 14' by a circle of screws 74 which extend through the collar 72 and thread into the shoulder of the roll 14' as shown in FIG. 3. The collar 72 has a circumferential face 76 which is, in effect, an extension of the circumferential face of the roll 14' end which is preferably ground at the same time as the circumferential face of the full diameter portion of the roll 14'. Contact 38 on the arm 34 bears against this circumferential surface 76 with the same result as when it contacted with the face of the full diameter portion of the roll 14 in FIG. 1.

The collars 62 and 72 may be forgings or castings; and they have large areas of contact with the rolls to which they are connected to provide for heat transfer so that the collars and rolls will be at similar temperatures. Each of the collars 62 and 72 is shaped to provide axially spaced circumferential surfaces and to provide radial clearance for the contacts 30 and 38, and the arms 32 and 34 that cooperate with the other collar.

Figure 5:
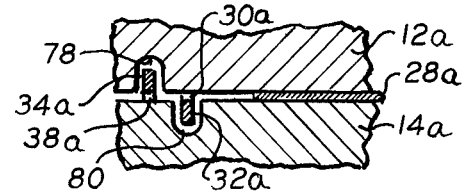
FIG. 5 is a fragmentary, sectional view of modified grooves in the rolls for providing clearance behind the arms of the sensing equipment.

FIG. 5 shows rolls 12a and 14a rolling a strip of metal 28a. A contact 38a bears against the full diameter portion of the roll 14a and is carried by an arm 34a which extends into a groove 78 in the roll 12a. A contact 30a bears against the full diameter of the roll 12a and this contact 30a is carried by an arm 32a which extends into a groove 80 provided in the roll 14a to furnish clearance for the contacts 30a and arm 32a.

Grooves 78 and 80 are machined in the circumferential faces of the rolls 12a and 14a but they have curved bottom surfaces tangent with the sides of the grooves so as to prevent the setting up of high stresses such as occur at sharp corners in grooves of rolls that are subject to high bending stresses. This is more true of 2-high mills than it is of 4-high mills where the working rolls are subject to lower bending stresses.

The preferred embodiments of the invention have been illustrated and described, but changes and modifications can be made and some features can be used in different combinations without departing from the invention as defined in the claims.

What is claimed is:

1. A rolling mill comprising a first and a second roll that rotate on parallel axes and that have cylindrical working faces which form a roll pass through which material travels to determine the gauge of said material, sensors for determining movement on the rolls toward and from one another including a first sensor that is adjacent to a circumferential area of said first roll at a location immediately adjacent to a center line extending through the axes of said rolls but axially spaced from the surfaces of the rolls that contact with the material that travels through the roll pass, a second sensor that is adjacent to a circumferential area of the second roll at a location immediately adjacent to a center line extending through the axes of said rolls and axially spaced from the first sensor and from the surfaces of the rolls that contact with the material that travels through the roll pass, said circumferential area of each of said first and second rolls being axially spaced from the corresponding circumferential area of the other roll and being substantially coaxial with its roll and of the same circumference as the cylindrical working face of its roll and located in position to be ground whenever the working face of its roll is ground and as part of the grinding operation whereby any eccentricity ground into the working face is duplicated in said circumferential area of the roll, one of the rolls having a circumferential recess between its working face and its circumferential area that is adjacent to one of the sensors for providing clearance for the sensor that is adjacent to the circumferential area of the other roll, a frame connected with the respective sensors, a transducer operated by relative movement in said frame, and apparatus responsive to signals from the transducer.

2. The rolling mill described in claim 1 characterized by each of the sensors being a contact that bears against the circumferential area to which it is adjacent, the frame having a separate arm for each of the contacts, and spring means for holding the contacts against said circumferential area of the rolls.

3. The rolling mill described in claim 2 characterized by the frame being shaped with spring means formed by an element that extends around a support for most of the circumference of the support, the arms of the frame extending away from the support in generally parallel planes but having offset free ends remote from the support and that carries the contacts.

4. The rolling mill described in claim 3 characterized by the frame being metal and of one-piece construction, the arms being rigid and of greater cross section than the spring portion of the frame, the arms becoming of less cross section toward the contact ends thereof, the offset of the contacts being in directions parallel to the axes of the rolls and being obtained by having different sides of the arms diverge from one another as the arms extend toward the contacts, and the contacts being different pieces from the arms and secured thereto.

5. The rolling mill described in claim 1 characterized by the circumferential areas of each of the rolls being shaped to provide an axially extending portion of reduced radius, including said circumferential recess of one roll, to provide clearance from the confronting circumferential area of the other roll for an axially extending distance sufficient to provide clearance for the frame that supports the sensor that is adjacent to the circumferential area that confronts said clearance.

6. The rolling mill described in claim 5 characterized by the circumferential recess in one of the rolls being a circumferential groove that provides the clearance, and one of the sensors being located in said groove.

7. The rolling mill described in claim 5 characterized by the circumferential recess in one of the rolls being a circumferential groove that provides the clearance, the other roll having its circumferential area confronting the groove, and the frame and sensor that extends into said clearance extending adjacent to said circumferential area of said other roll.

8. The rolling mill described in claim 7 characterized by the groove for providing clearance having a cross section with the bottom of the groove merging into the sides of the groove along curves that avoid any substantial change in direction of the surface of the groove to prevent stress concentrations at the surface of the groove when the grooved roller is under stress.

9. The rolling mill described in claim 1 characterized by both of the rolls being necked down at the ends thereof for extending into bearings, a first of the rolls being necked down further from its bearing to leave an axial length opposite the unnecked-down portion of the second roll to provide radial clearance for the part of the frame that carries the contact that bears against the surface of said second roll.

10. The rolling mill described in claim 1 characterized by both of the rolls having collar portions at the ends thereof and which are connected to and rigid parts of the roll structure, the circumferential areas of each of the rolls and to which the respective sensors are adjacent, being on the collar portions, and having radial clearance from the other roll for receiving the frame and contact that bears against the other roll.

11. The rolling mill described in claim 1 characterized by apparatus that controls the spacing of the rolls from one another, said apparatus being that which is responsive to the signals from the transducer.

12. The rolling mill described in claim 11 characterized by the apparatus that controls the spacing of the rolls from one another including a shim containing hydraulic fluid, and a control that supplies or withdraws hydraulic fluid to or from the shim in response to the signals from the transducer.

13. The rolling mill described in claim 1 characterized by the rolling mill being a sheet metal rolling mill with back-up rolls for loading the rolls that form the pass through which the material travels, apparatus for controlling the pressure on said rolls that form said pass, said apparatus being that which is responsive to the signals from the transducer.

14. The rolling mill described in claim 1 characterized by the mill having means for pre-stressing the mill, apparatus acting against the direction of the pre-stressing force to control the pressure of the rolls, that form the pass, against material that travels through the pass, said apparatus being that which is responsive to the signals from the transducer.

* * * * *